United States Patent
Wang

(10) Patent No.: US 7,813,122 B2
(45) Date of Patent: Oct. 12, 2010

(54) ELECTRONIC DEVICE WITH SUPPORT MEMBER

(75) Inventor: Wei-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 130 days.

(21) Appl. No.: 12/347,571

(22) Filed: Dec. 31, 2008

(65) Prior Publication Data

US 2010/0118481 A1 May 13, 2010

(30) Foreign Application Priority Data

Nov. 12, 2008 (CN) .......................... 2008 1 0305488

(51) Int. Cl.
*G06F 1/16* (2006.01)

(52) U.S. Cl. ............................. 361/679.55; 455/556.1; 16/277; 345/163; 174/483

(58) Field of Classification Search ............ 361/679.55, 361/679.58, 679.01, 679.31, 679.02, 679.37, 361/679.08, 679.23, 679.09, 679.41; 455/556.1, 455/575.1; 244/188.6; 16/277, 370, 260, 16/268, 412, 360; 345/91.2, 163, 89; 312/223.2, 312/114, 7.2, 244; 174/166, 520, 50.5, 483
See application file for complete search history.

(56) References Cited

U.S. PATENT DOCUMENTS

| | | | |
|---|---|---|---|
| 7,117,009 B2 * | 10/2006 | Wong et al. | 455/556.1 |
| 7,495,898 B2 * | 2/2009 | Lo et al. | 361/679.55 |
| 2010/0122432 A1 * | 5/2010 | Cao | 16/277 |
| 2010/0127137 A1 * | 5/2010 | Wang | 248/188.6 |

* cited by examiner

*Primary Examiner*—Hung V Duong
(74) *Attorney, Agent, or Firm*—Clifford O. Chi

(57) ABSTRACT

An electronic device includes a main body, two pivot shafts, a cover rotatably connected to the main body via the pivot shafts, and two supporting members extending from a side of the cover and connected to the main body. Each supporting member has a supporting surface. A distance between the supporting surface and an axis of the pivot shaft is larger than a distance between a bottom surface of the main body and the axis of the pivot shaft.

18 Claims, 11 Drawing Sheets

ELECTRONIC DEVICE WITH SUPPORT MEMBER

BACKGROUND

1. Field of the Disclosure

The present disclosure generally relates to electronic devices and, particularly, to an electronic device with a main body and a rotatable cover.

2. Discussion of the Related Art

Notebook computers have become popular alternatives to desktop computers because of their portability. A typical notebook computer includes a display body and a main body with a keyboard. The display body is rotatably attached to the main body so that the display body can be opened and closed relative to the main body. In most circumstances, the typical notebook computer is operated on a tabletop. However, the keyboard is usually parallel to the tabletop making it very uncomfortable for a user to operate the notebook. In addition, the main body of the notebook computer is in contact with the tabletop. Heat produced by internal electronic components cannot be dispersed efficiently from the main body of the notebook, even though the notebook has a fan for heat dissipation. As a result, the internal electronic components may be damaged from overheating. Accordingly, a notebook computer which can solve the above-described problems is needed.

One such notebook computer has a keyboard popped up away from a main body of the notebook computer and slanted relative to the main body so that it may be comfortable for the user to operate the keyboard. In addition, a gap for emitting heat is formed between the keyboard and the main body.

However, dust and harmful substances may easily get inside the main body through the gap and deposit on the internal electronic components. This may cause a short circuit of the internal electronic components, and make it difficult to disperse the heat produced by the internal electronic components.

Therefore, an electronic device which overcomes the above-described shortcomings is desired.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
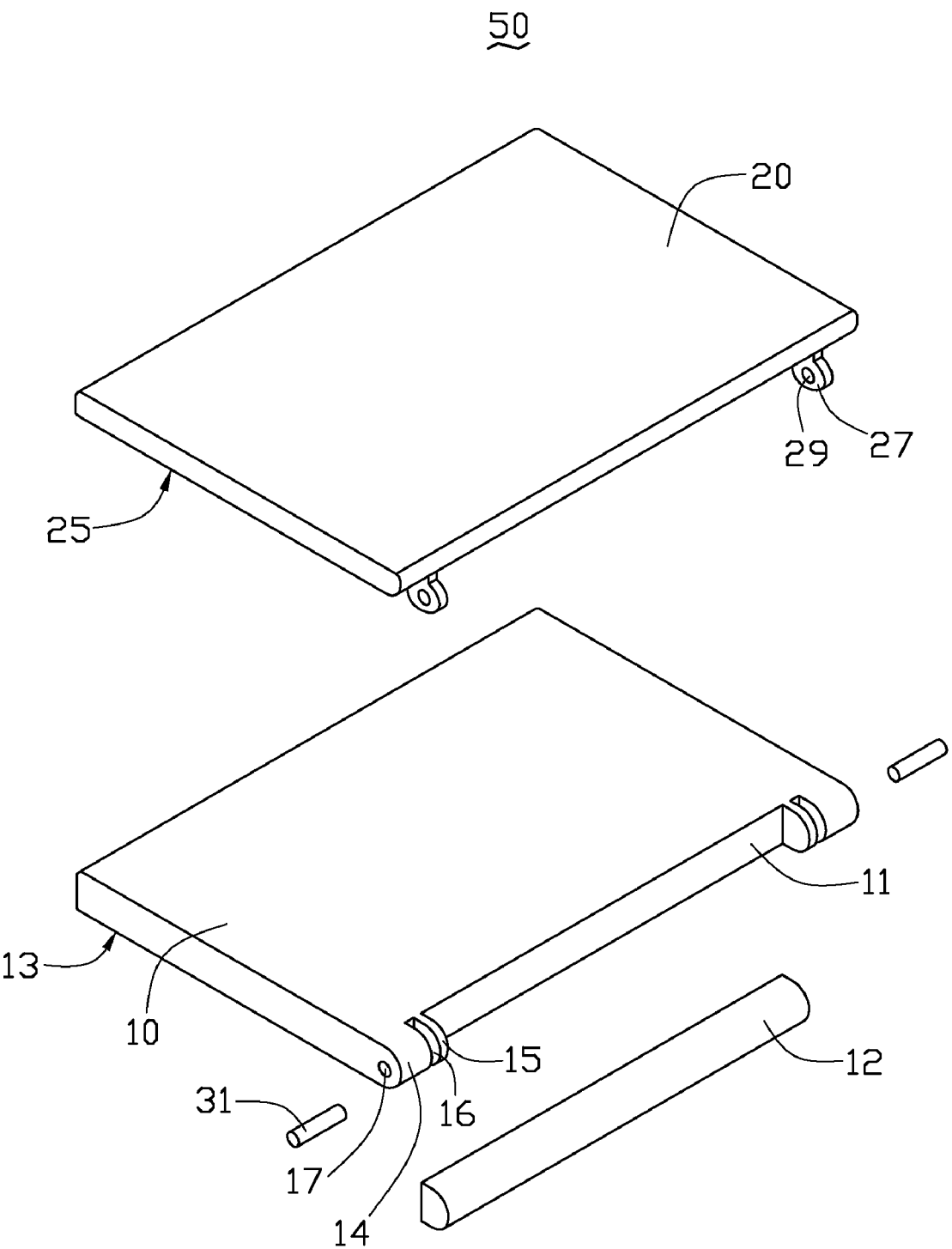
FIG. 1 is an exploded, isometric view of a first embodiment of an electronic device, the electronic device including a main body, a cover, and pivot shafts.

Referring to FIG. 1, a first embodiment of an electronic device 50 includes a main body 10, a cover 20, a battery 12, and two pivot shafts 31. The cover 20 is rotatably connected to the main body 10 via the pivot shafts 31. In the illustrated embodiment, the electronic device 50 is a notebook computer.

The main body 10 includes a side surface 11 and a bottom surface 13 adjacent to the bottom surface 11. Two assembling portions 14 are formed on opposite ends of the side surface 11. Two positioning portions 15 are also formed on opposite ends of the side surface 11, with each positioning portion 15 adjacent to one corresponding assembling portion 14. A receiving groove 16 is defined between the positioning portion 15 and the adjacent assembling portion 14. Each assembling portion 14 defines a connecting hole 17 communicating with the receiving groove 16. The battery 12 is positioned between the positioning portions 15. In the illustrated embodiment, the main body 10 is substantially rectangular shaped.

Figure 2:
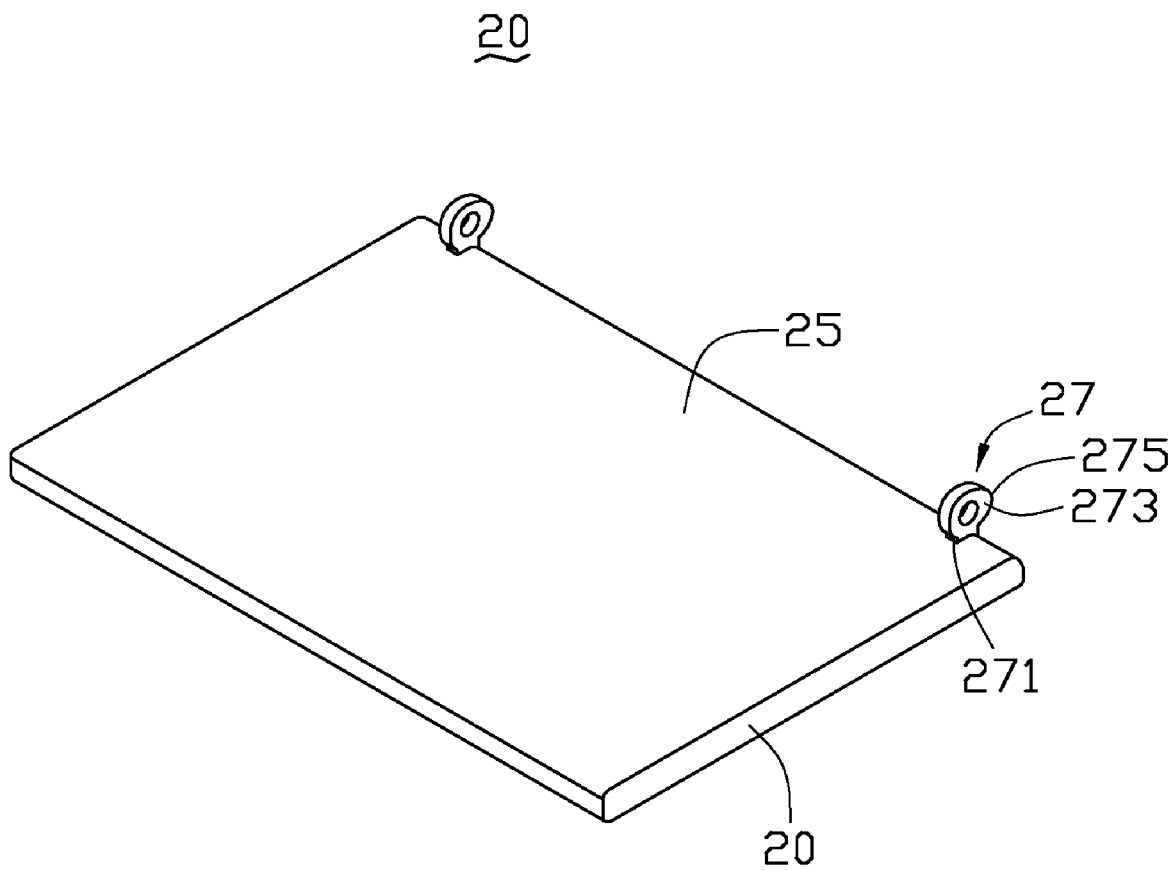
FIG. 2 is an isometric view of the cover of FIG. 1.
Figure 3:
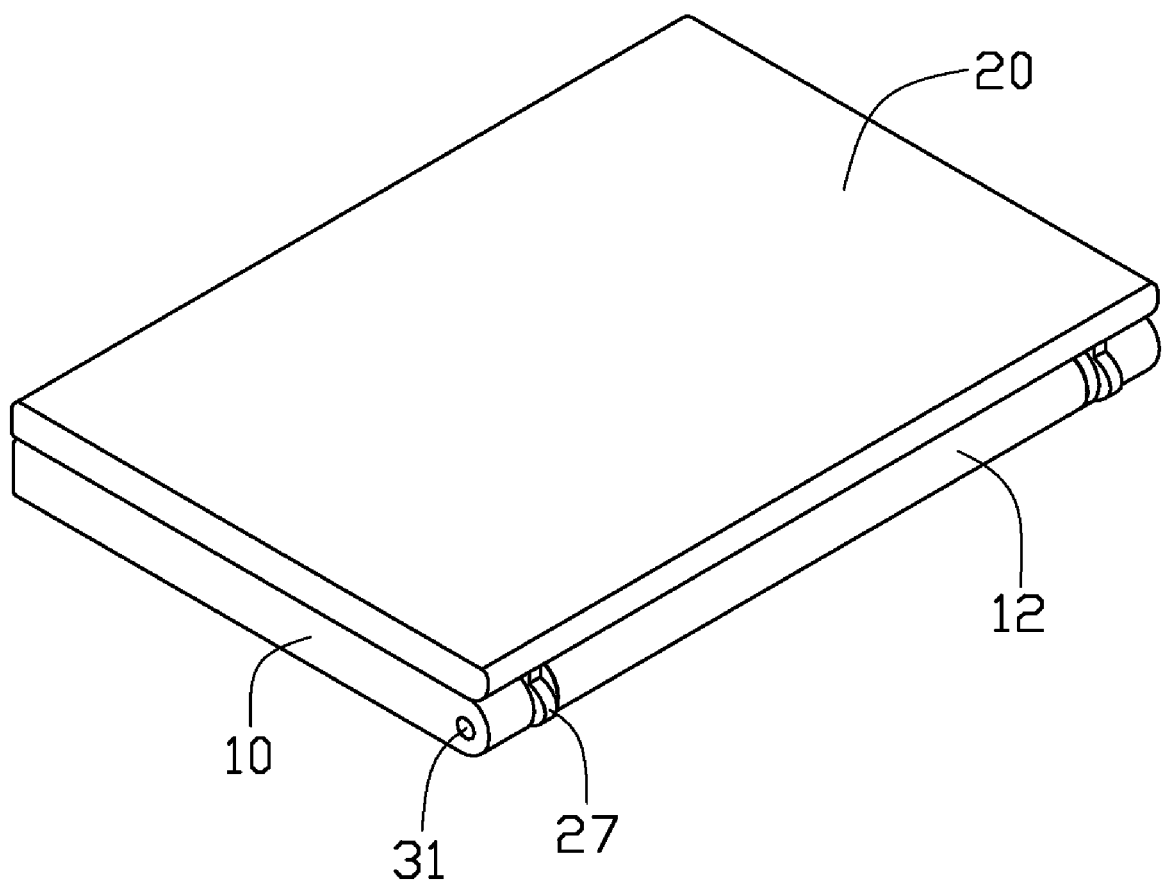
FIG. 3 is an assembled, isometric view of the electronic device of FIG. 1, showing a closed state.
Figure 4:
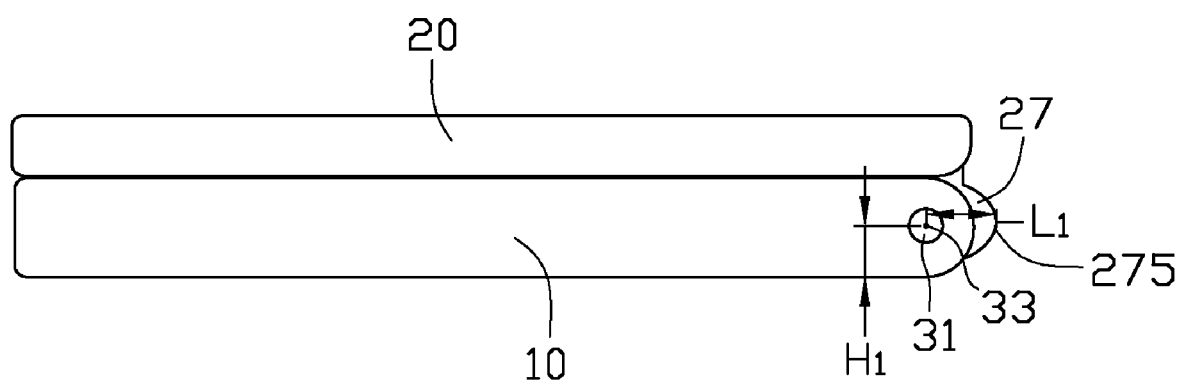
FIG. 4 is a side view of the electronic device of FIG. 3.
Figure 5:
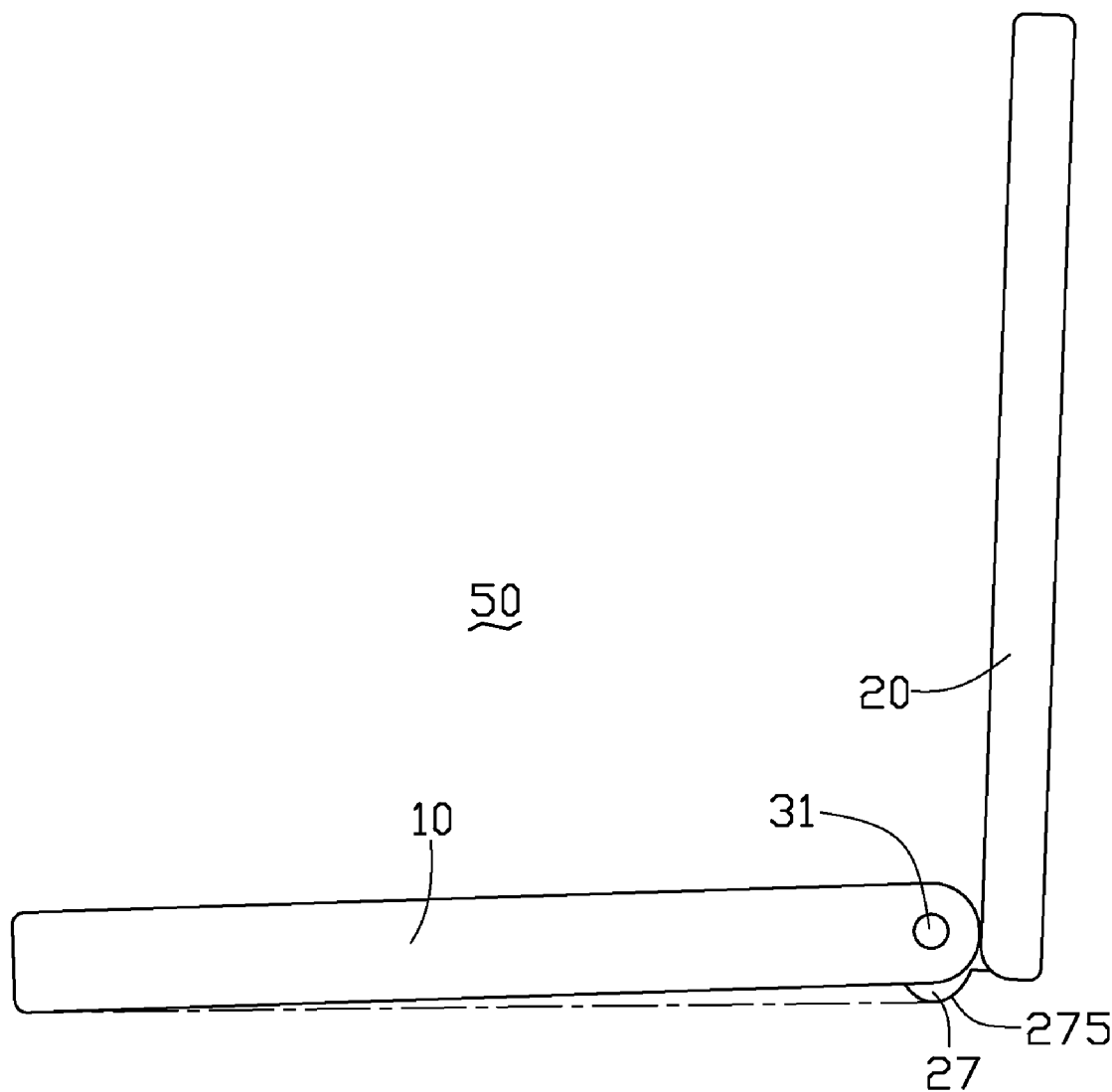
FIG. 5 is similar to FIG. 4, but showing an opened state.
Figure 6:
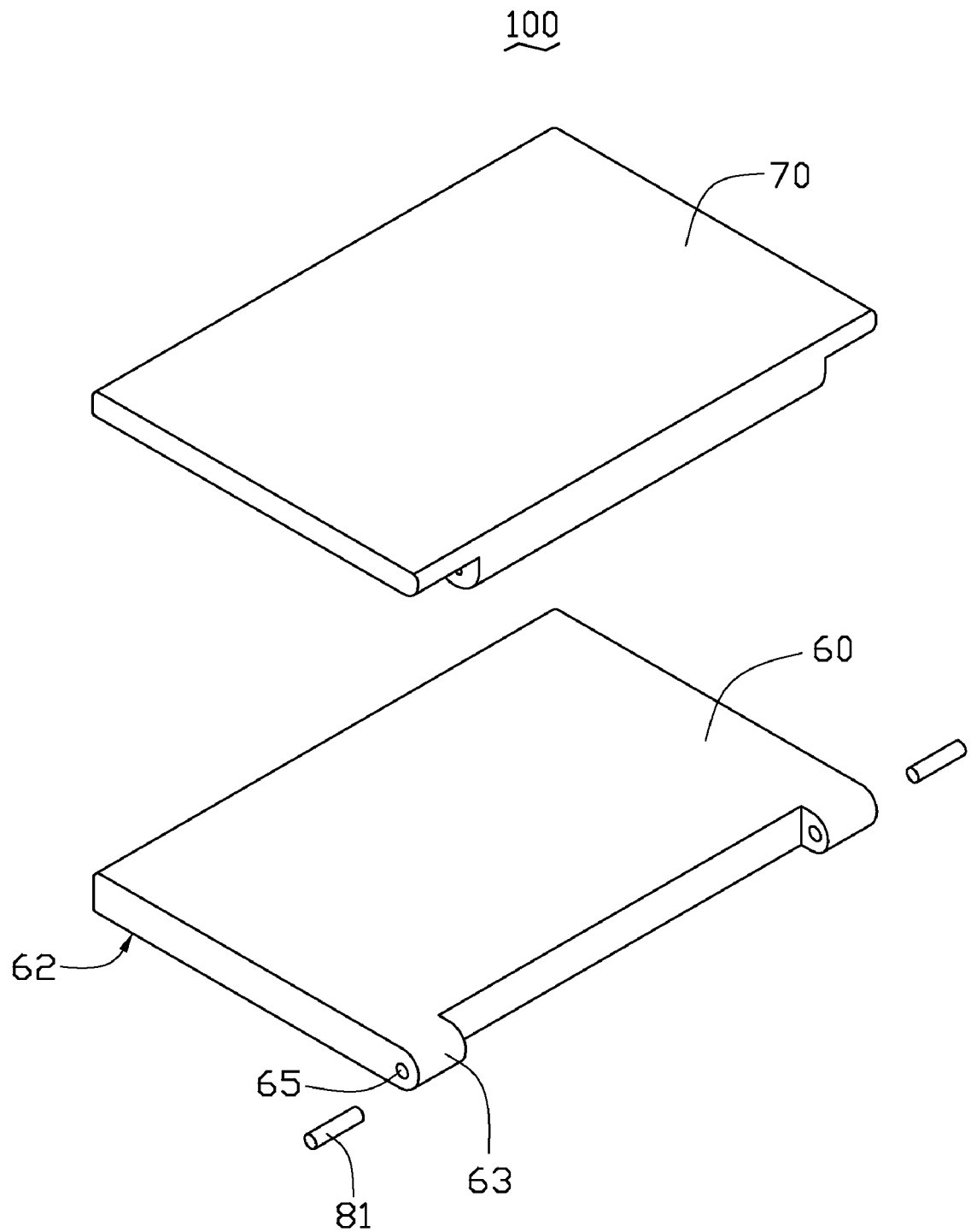
FIG. 6 is an exploded, isometric view of a second embodiment of an electronic device, the electronic device including a main body, a cover, and pivot shafts.
Figure 7:
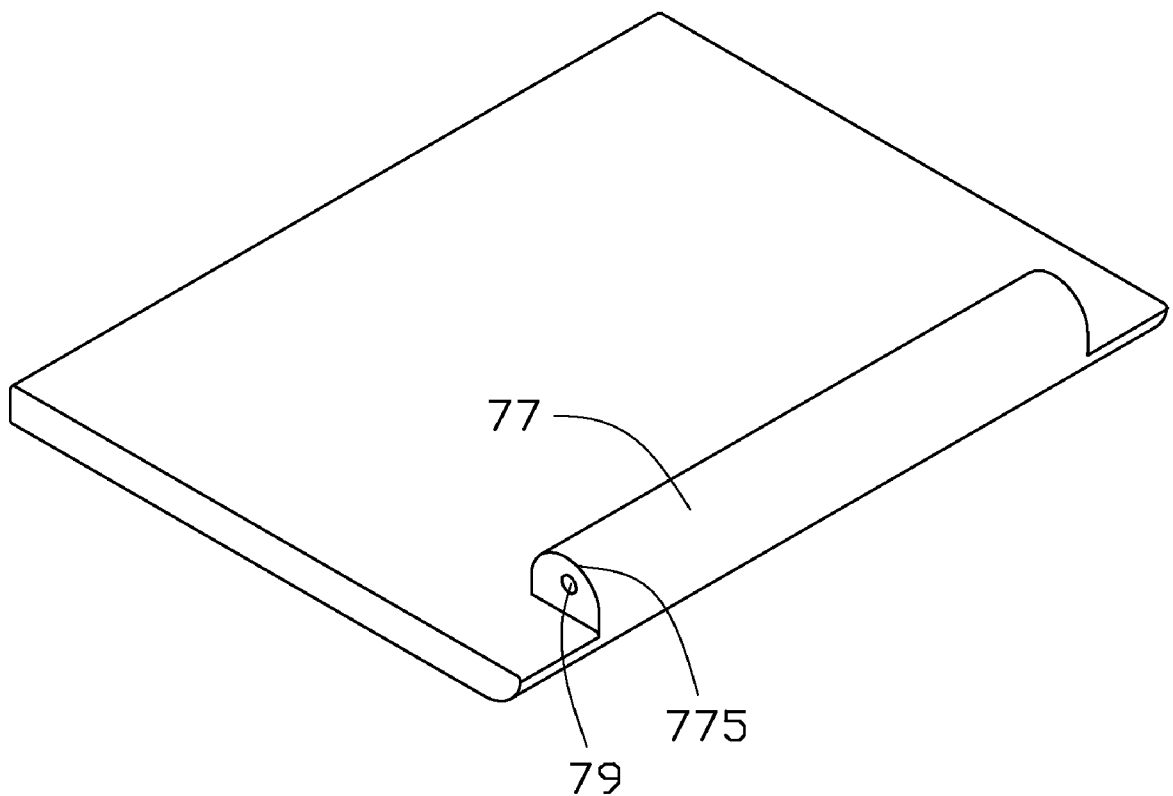
FIG. 7 is an isometric view of the cover of FIG. 6.
Figure 8:
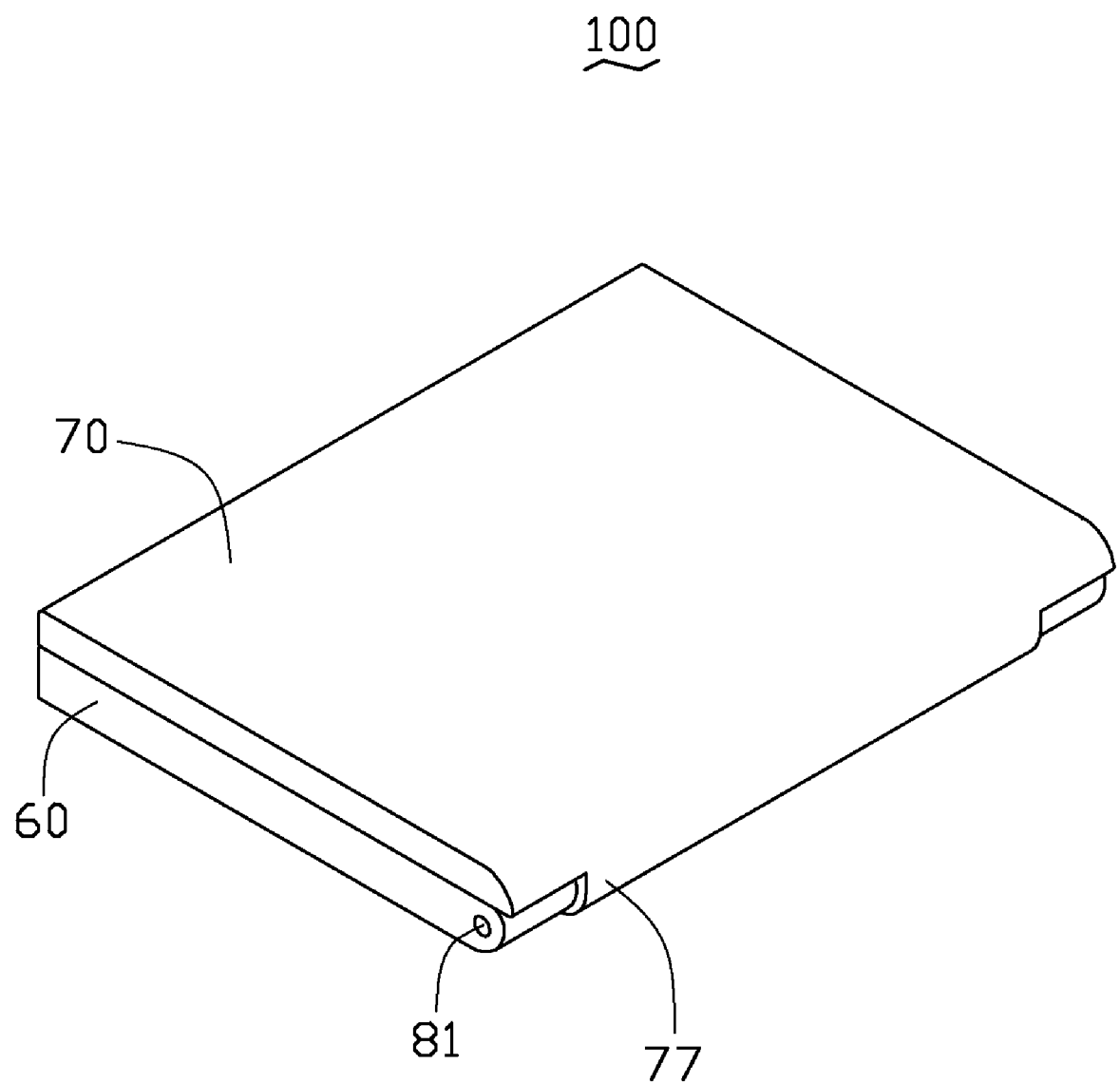
FIG. 8 is an assembled, isometric view of the electronic device of FIG. 6 in a closed state.
Figure 9:
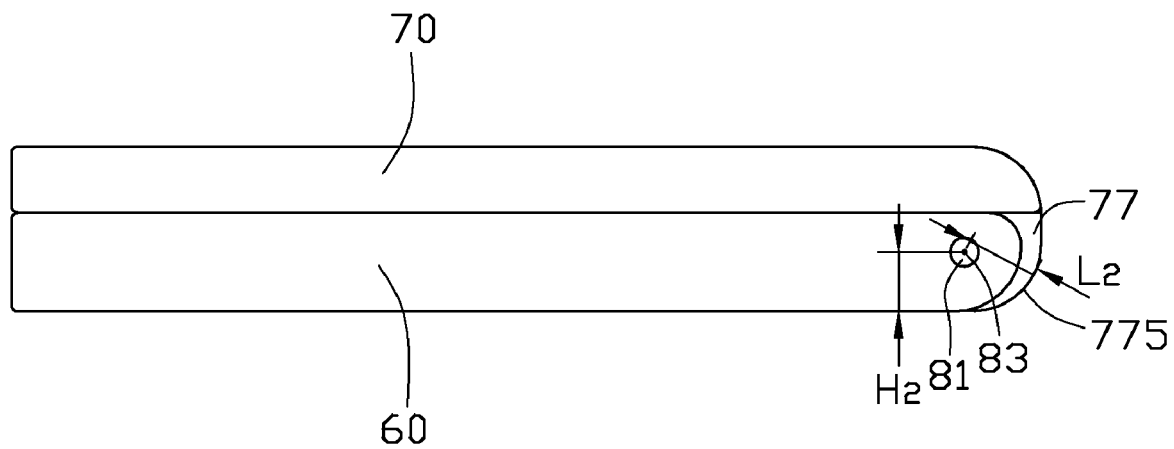
FIG. 9 is a side view of the electronic device of FIG. 8.
Figure 10:
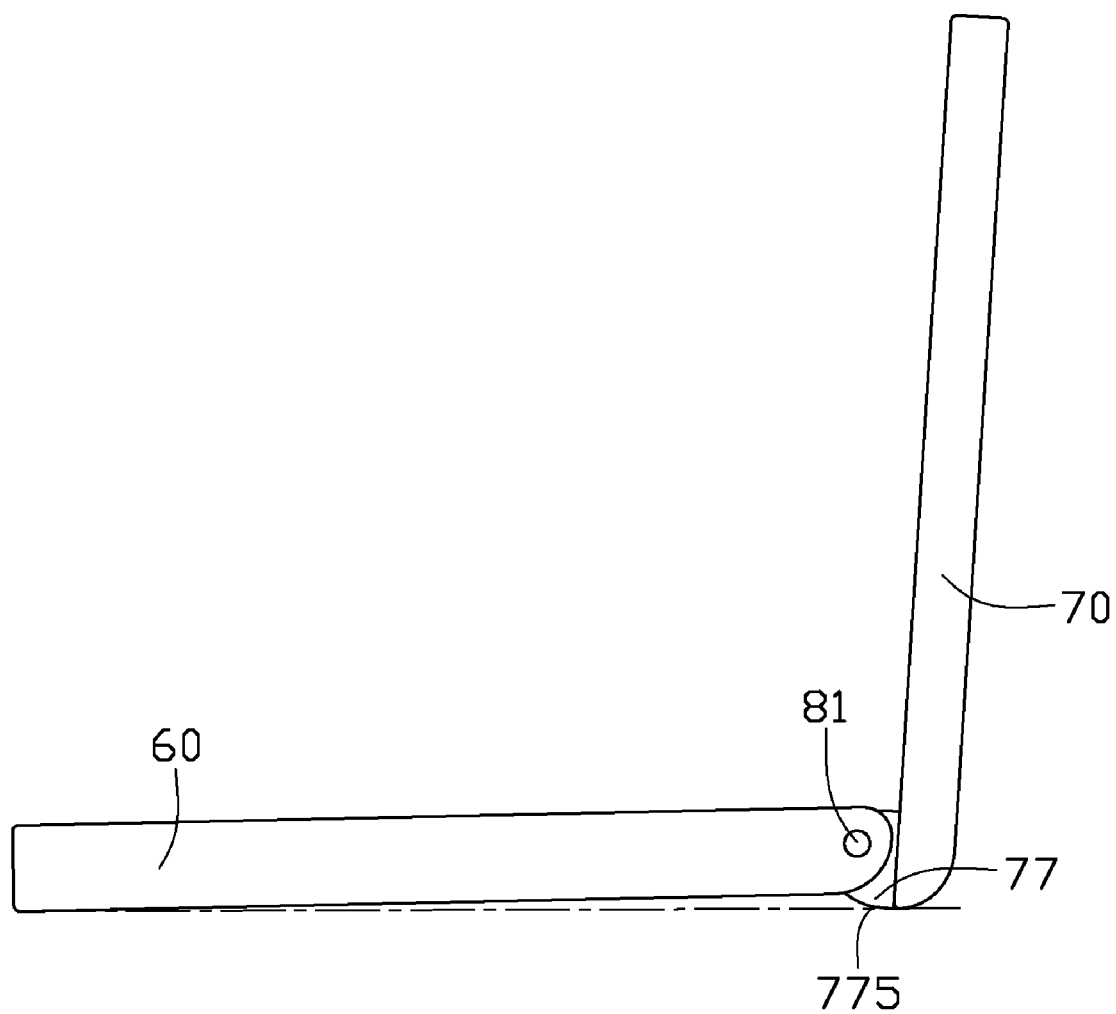
FIG. 10 is similar to FIG. 9, but showing an opened state.

Referring to FIG. 2, the cover 20 includes a bottom surface 25 and two supporting members 27 formed on opposite ends of a side of the bottom surface 25 of the cover 20. Each supporting member 27 includes a connecting portion 271 and a cam portion 273 extending from an end of the connecting portion 271. A supporting surface 275 is formed on a periphery of the cam portion 273. The supporting surface 275 is a part of a periphery surface of the cam portion 273. The cam portion 273 defines a positioning hole 29 to receive the pivot shafts 31. In the illustrated embodiment, the cover 20 is substantially rectangular shaped, and the supporting members 27 and the cover 20 are integrally formed.

Referring to FIGS. 1 through 5, in assembling the electronic device 50, the battery 12 is positioned between the positioning portions 15 of the main body 10. The cover 20 is coupled to the main body 10, and each supporting member 27 is received in one corresponding receiving groove 16. The pivot shafts 31 extend through the assembling portions 14 and the supporting members 27 of the cover 20, thus rotatably connecting the cover 20 to the main body 10. A distance $L_1$ between the supporting surface 275 and the axis 33 of the pivot shaft 31 is larger than a distance $H_1$ between the bottom surface 13 of the main body 10 and the axis 33 of the pivot shaft 31. The distance $L_1$ between different positions of the supporting surface 275 and the axis 33 of the pivot shaft 31 are different.

When the electronic device 50 is in a closed state, each supporting member 27 is partially received in the receiving groove 16, and the supporting surface 275 of each supporting member 27 protrudes out from a side of the main body 10 receiving the battery 12. Thus, the main body 10 is not supported by the supporting members 27. In opening the electronic device 50, the supporting member 27 also rotates on the pivot shafts 31 relative to the main body 10. When the supporting member 27 rotates on the pivot shafts 31 to a predetermined angle, the supporting surface 275 of each supporting member 27 protrudes out from the bottom surface 13 of the main body 10. As a result, the main body 10 of the electronic device 50 is lifted and supported at an inclined angle by the supporting members 27. In the illustrated embodiment, a spacious gap with a maximum height of about 2 centimeters is formed between the bottom surface 11 of the main body 10 and a supporting area.

In an opened state, the electronic device 50 is inclined at an angle such that the lifted side of the electronic device 50 is above the supporting area such as a tabletop. Therefore, operating a keyboard of the electronic device 50 would be more comfortable. In addition, heat can be dispersed from the bottom surface 13 through the spacious gap defined between the main body 10 and the supporting area. Accordingly, the heat emitted or generated by the electronic components can be dispersed more efficiently. The supporting surface 275 of each supporting member 27 extends through the bottom surface 13 of the main body 10 by opening the cover 20, so the electronic device 50 is convenient to use.

It should be understood that the electronic device 50 may include three or more supporting members 27. The supporting members 27 can be integrally formed with the pivot shafts 31, and the pivot shafts 31 are non-rotatably connected to the cover 20. In addition, the supporting members 27 may be formed on a cover of other electronic devices, such as a personal digital assistant.

Referring to FIGS. 6 through 10, a second embodiment of an electronic device 100 is similar to the first embodiment of the electronic device 50, except that a main body 60 only defines two assembling portions 63 on opposite ends of a side surface 61, and a supporting member 77 is formed at a middle portion of one side of a cover 70. In the illustrated embodiment, the supporting member 77 is a column in shape. Each assembling portion 63 defines a connecting hole 65. The supporting member 77 defines a pivot hole 79. A plurality of pivot shafts 81 extend through the connecting holes 65 of the assembling portions 63, and are received in the pivot holes 79 of the supporting members 77, thus rotatably connecting the cover 70 to the main body 60. A distance $L_2$ between a supporting surface 775 and an axis 83 of the pivot shaft 81 is larger than a distance $H_2$ between a bottom surface 62 of the main body 60 and the axis 83 of the pivot shaft 81. The distance $L_2$ between different positions of the supporting surface 775 and the axis 83 of the pivot shaft 81 are different. Therefore, the supporting surface 775 of the supporting member 77 protrudes out of a bottom surface 62 of the main body 60 by opening the cover 70. As a result, the main body 60 of the electronic device 100 is lifted and supported at an inclined angle by the supporting member 77.

Figure 11:
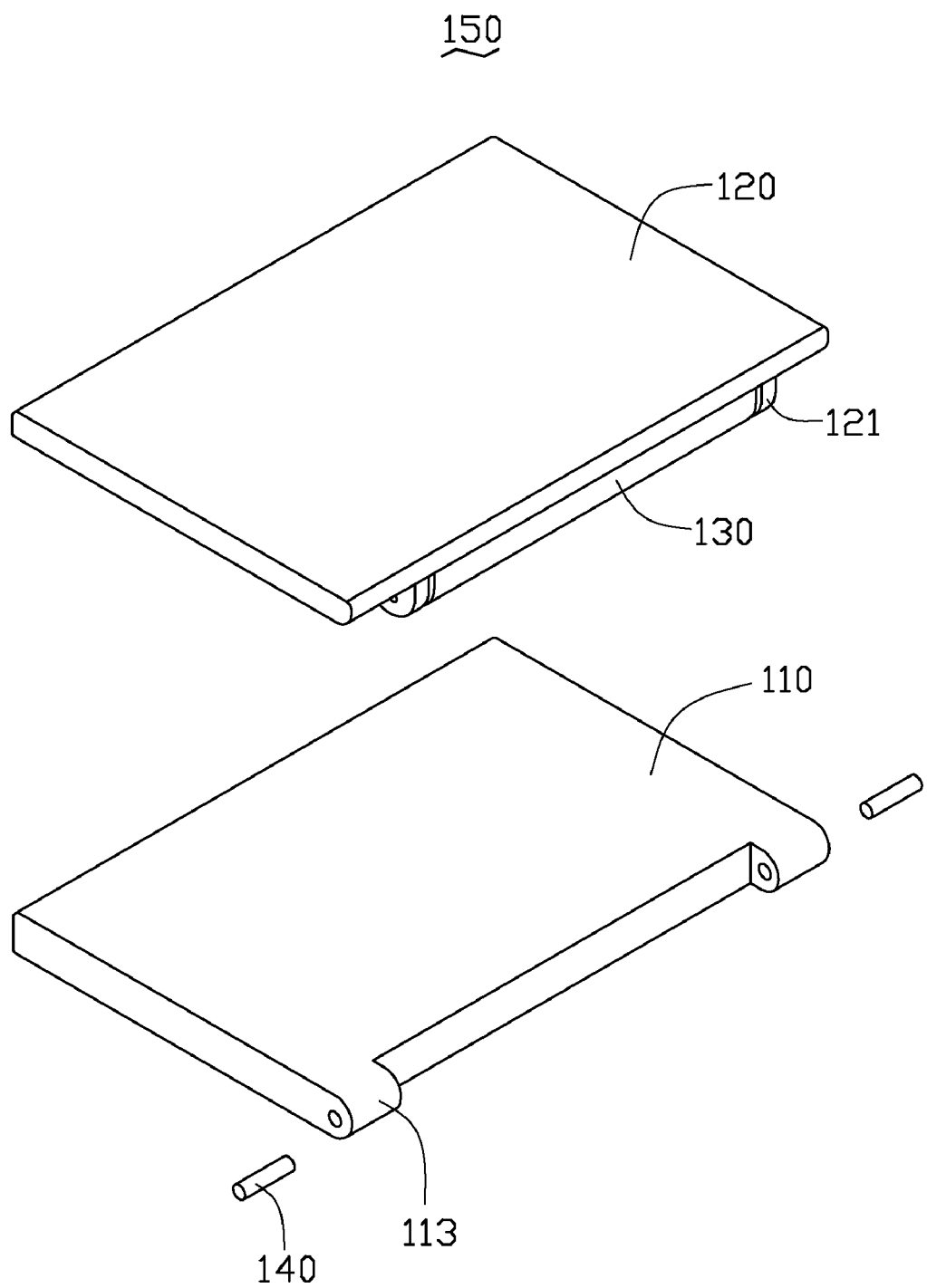
FIG. 11 is an exploded, isometric view of a third embodiment of an electronic device.

Referring to FIG. 11, a third embodiment of an electronic device 150 is similar to the second embodiment of the electronic device 100, except that two connecting portions 121 are formed on a cover 120 at opposite sides of a supporting member 130. Each pivot shaft 140 extends through one assembling portion 113 and one corresponding connecting portion 121, thus rotatably connecting the cover 120 to a main body 110. Therefore, the main body 110 of the electronic device 150 is lifted and supported at an inclined angle by the supporting member 130.

It is believed that the present embodiments and their advantages will be understood from the foregoing description, and it will be apparent that various changes may be made thereto without departing from the spirit and scope of the disclosure or sacrificing all of its material advantages.

What is claimed is:

1. An electronic device, comprising:
   a main body;
   a cover comprising at least one supporting member extending from the cover and connected to the main body, the at least one supporting member has a supporting surface; and
   at least one pivot shaft rotatably connecting the cover to the main body, wherein a distance between the supporting surface and an axis of a corresponding pivot shaft of the at least one pivot shaft is larger than a distance between a bottom surface of the main body and the axis of the corresponding pivot shaft of the at least one pivot shaft.

2. The electronic device of claim 1, wherein the at least one supporting member comprises a cam portion, and the supporting surface is formed on a periphery of the cam portion.

3. The electronic device of claim 2, wherein the at least one supporting member is integrally formed with the cover.

4. The electronic device of claim 1, wherein the at least one supporting member comprises two supporting members formed on opposite ends of a side of the cover.

5. The electronic device of claim 4, wherein the main body comprises two assembling portions formed on opposite ends of a side surface of the main body, and two positioning portions formed on opposite ends of the side surface adjacent to a corresponding assembling portion; a receiving groove is defined between one positioning portion and one adjacent assembling portion; the supporting member is received in the receiving groove.

6. The electronic device of claim 5, further comprising a battery positioned between the two positioning portions.

7. The electronic device of claim 5, wherein the at least one pivot shaft extends through one assembling portion and one adjacent supporting member, thus rotatably connecting the cover to the main body.

8. The electronic device of claim 1, wherein the at least one supporting member comprises one supporting member formed on a middle portion of the side of the cover connecting to the main body.

9. The electronic device of claim 1, wherein distances between different positions of the supporting surface and the axis of the pivot shaft are different.

10. The electronic device of claim 1 being a notebook computer.

11. An electronic device, comprising:
    a main body;
    a cover comprising at least one supporting member on a side thereof; and
    at least one pivot shaft rotatably connecting the cover to the main body;
    wherein the at least one supporting member is rotatably sleeved on the pivot shaft; when the cover rotates relative to the main body, the at least one supporting member rotates on the pivot shaft, so that the main body is supported by the at least one supporting member.

12. The electronic device of claim 11, wherein each of the at least one supporting member comprises a cam portion having a supporting surface formed on a periphery of the cam portion.

13. The electronic device of claim 12, wherein the at least one supporting member is integrally formed with the cover.

14. The electronic device of claim 11, wherein the at least one supporting member comprises two supporting members formed on opposite ends of the side of the cover.

15. The electronic device of claim 14, wherein the main body comprises two assembling portions formed on opposite ends of a side surface of the main body, and two positioning portions formed on opposite ends of the side surface adjacent to a corresponding assembling portion; a receiving groove is formed between one positioning portion and one adjacent assembling portion; the supporting member is received in the receiving groove.

16. The electronic device of claim 15, further comprising a battery positioned between the two positioning portions.

17. The electronic device of claim 11, wherein the at least one supporting member comprises one supporting member formed on a middle portion of the side of the cover connecting to the main body.

18. The electronic device of claim 11 being a notebook computer.

* * * * *